United States Patent [19]

Cooke, Jr.

[11] 3,888,311

[45] June 10, 1975

[54] HYDRAULIC FRACTURING METHOD

[75] Inventor: Claude E. Cooke, Jr., Houston, Tex.

[73] Assignee: Exxon Production Research Company, Houston, Tex.

[22] Filed: Oct. 1, 1973

[21] Appl. No.: 402,538

[52] U.S. Cl.................................................. 166/280
[51] Int. Cl............................................ E21b 43/26
[58] Field of Search ............ 166/280, 308, 281, 295

[56] References Cited
UNITED STATES PATENTS

| | | |
|---|---|---|
| 2,879,847 | 3/1959 | Irwin................................ 166/280 X |
| 2,933,135 | 4/1960 | Johnson............................... 166/280 |
| 3,026,938 | 3/1962 | Huitt et al............................ 166/280 |
| 3,254,717 | 6/1966 | Huitt et al............................ 166/280 |
| 3,336,979 | 8/1959 | Ingraham et al................. 166/280 X |
| 3,353,601 | 11/1967 | Dollarhide et al.............. 166/280 X |
| 3,659,651 | 5/1972 | Graham............................... 166/280 |

*Primary Examiner*—Stephen J. Novosad
*Attorney, Agent, or Firm*—Robert L. Graham

[57] ABSTRACT

A method of fracturing subterranean formations which employs propping agent particles composed of resin-filled or fiber-reinforced cement pellets or resin-filled clinker.

21 Claims, 2 Drawing Figures

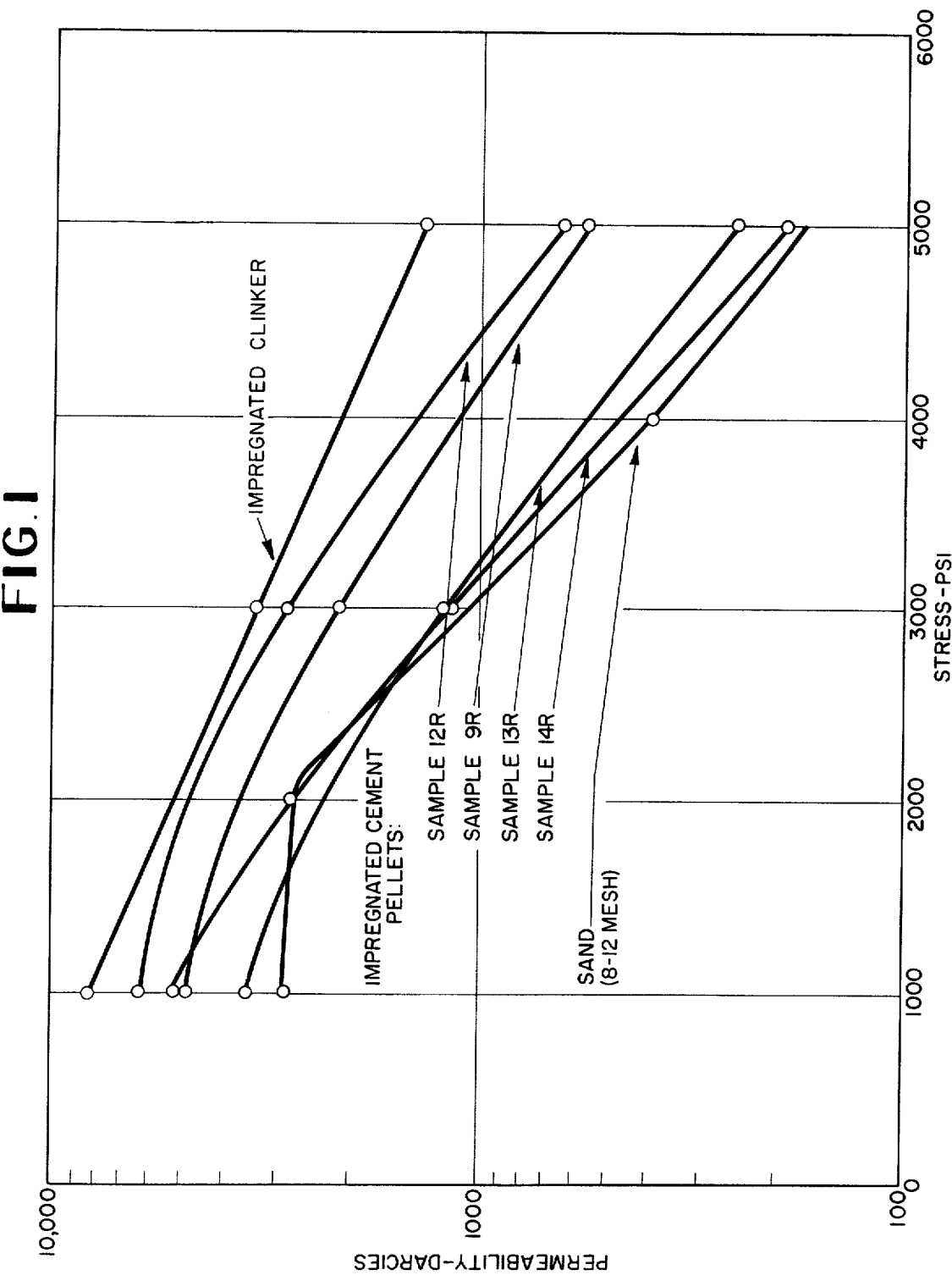

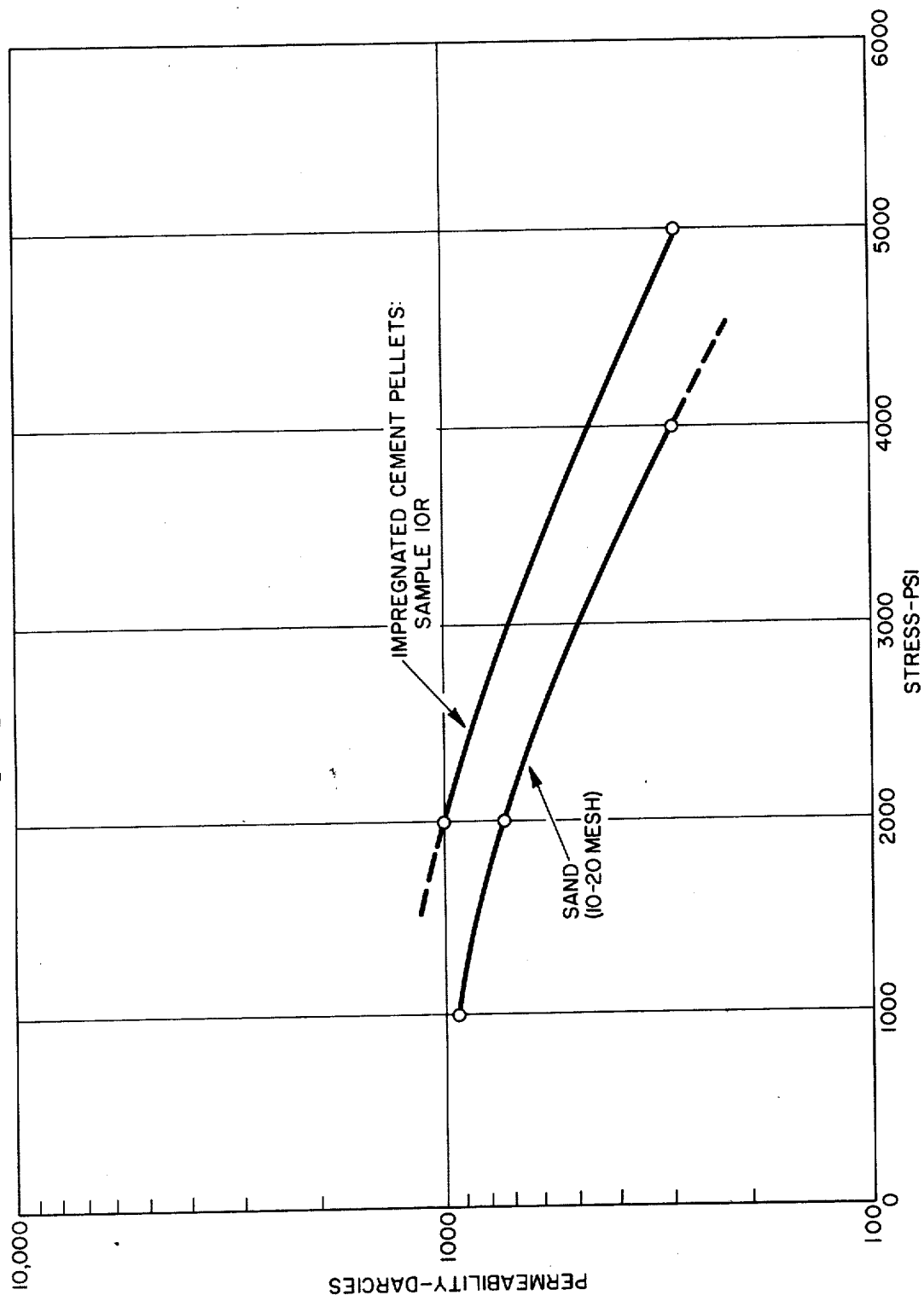

HYDRAULIC FRACTURING METHOD

BACKGROUND OF THE INVENTION

1. Field of the Invention

This invention relates to a method of fracturing subterranean formations surrounding oil wells, gas wells, and similar boreholes. The method involves the use of an improved propping agent.

2. Description of the Prior Art

Hydraulic fracturing is a well stimulation technique designed to increase the productivity of a well by creating highly conductive fractures or channels in the producing formation surrounding the well. The process normally involves two basic steps: (1) injecting a fluid at suffficient rate and pressure to rupture the formation thereby creating a crack (fracture) in the reservoir rock and (2) thereafter placing a particulate material (propping agent) in the formation to maintain the fracture in a propped condition. When the pressure in the fracture is relieved, the overburden earth stresses tend to close the fracture on the propping agent placed therein. If stimulation is to occur, the propping agent must have sufficient mechanical strength to bear the closure stresses and provide relatively high permeability in the propped fracture.

A variety of particulate materials have been proposed for use as propping agents in hydraulic fracturing operations. These materials fall into two general classes: (1) deformable proppants and (2) brittle proppants. The former class, typified by plastic pellets, is normally placed in the fracture in a partial monolayer pattern whereas the brittle proppants are normally placed in the fracture in multi-layer pattern. The present invention is concerned with brittle proppants.

The main problem associated with conventional brittle proppants, e.g. sand, is their propensity to fragment or disintegrate under earth closure stresses. This not only reduces the width of the propped fracture but produces fines which plug flow channels in the propped fracture. Tests have shown that the plugging effects of fragmented sand drastically reduce the permeability of the propped fracture. Efforts to develop a proppant capable of bearing stress without excessive disintegration have produced such materials as glass beads, steel shot and the like. These materials, however, are expensive and are normally used only under special conditions where economic incentive justifies the high cost.

SUMMARY OF THE INVENTION

In the method of the present invention, a fracture generated in a subterranean formation by the application of hydraulic force is propped with improved propping agent composed of cement pellets or cement clinker particles. The cement pellets are impregnated with a resinous material, or reinforced with fibrous material, or both. The cement clinker particles are also impregnated with a resinous material.

Laboratory tests have shown that propping agent particles containing either fibrous reinforcement or a thermosetting resin exhibit far less tendency to crush than sand. Additional tests have shown that the resin-impregnated particles retain substantially more permeability under stress than sand.

The preferred propping agents include the following: cement pellets containing from 5 to 50 weight percent of fibrous reinforcement, preferably asbestos; cement pellets or clinker particles containing from 3 to 15 weight percent of a resin, preferably a thermoset; and cement pellets containing from 5 to 50 weight percent of reinforcing fibers and from 3 to 15 weight percent of a resin.

The cement pellets containing the reinforcement may be prepared by known pelletizing techniques. The reinforced pellets may themselves serve as the propping agent or may be impregnated with a liquid thermosetting resin providing a composite material. The impregnation process permeates the cement pellets and provides an outer coating for the pellets.

Cement clinker may be sieved to the proper mesh size and impregnated with a suitable resin to permeate each clinker particle and provide a coat thereon.

BRIEF DESCRIPTION OF THE DRAWINGS

FIG. 1 is a plot showing the permeability of several proppants at various stress levels and at 150°F.

FIG. 2 is a plot similar to FIG. 1 showing permeability of sand and impregnated proppants at 250°F.

DESCRIPTION OF THE PREFERRED EMBODIMENTS

It is well known in the petroleum industry that fracture conductivity is reduced by fragments or fines produced by the disintegration of propping agent particles. Silica sand is particularly susceptible to crushing at overburden stresses above about 4,000 psi. Tests have shown that the presence of 20% fines decreases fracture permeability by almost 50 percent. Methods to develop an inexpensive propping agent capable of bearing high compressive loads without excessive disintegration have not been successful.

The present invention employs an improved propping agent which has properties superior to silica sand, both in compressive strength and permeability retention under stress. In one embodiment, the propping agent is composed of cement pellets reinforced with fibrous material or impregnated with a synthetic resin, or both. In another embodiment, the propping agent consists of clinker impregnated with a synthetic resin.

The cement pellets may be formed by conventional pelletizing techniques using a mixture of dry cement, water, and fibers. The preferred fibrous reinforcements include asbestos, glass, and metal fibers. One technique for pelletizing these materials is described below under Pellet Preparation.

The term "cement", as used herein, refers to hydraulic cements. These cements are produced by burning an intimate mixture of finely divided calcareous and argillaceous material and grinding the resultant residue to produce a fine powder. The combustion residue is referred to as "clinker". This material, which consists principally of calcium silicates and aluminates, is discharged from the combustion kiln in particulate or pellet form. The clinker can be readily sieved to a mesh size suitable for use as a propping agent. The coating and impregnation of clinker with a synthetic resin greatly improves its load carrying ability and resistance to crushing.

The preferred cements are high strength cements of the Portland class and aluminous cements. Aluminous cements, sometimes called fondue, contain a higher percentage of aluminum than Portland cement. Aluminous cements are normally made from bauxite, hydrated alumina, and limestone.

As mentioned previously, the preferred reinforcement is asbestos fiber which may be mixed with the cement to provide loadings between about 5 and about 50 weight percent—the preferred range being between about 15 and about 30 weight percent—based upon the total weight of the pellet.

The cement pellets reinforced with fibers may also include other additives such as filler material, e.g. silica sand (silica flour), limestone, coke, fly ash and similar finely divided inert materials.

Laboratory tests have shown that reinforced cement pellets can be pelletized in a size suitable for use as a proppant for fracturing operations. The pellets can be screened to provide particle sizes between about 4 and 100 mesh, preferably between 8 and 20 mesh, based on the U.S. Standard Sieve Series. Crushing tests performed on cement pellets with and without asbestos fibers have shown that the reinforced pellets produce only about 40% of the fines produced by the unreinforced pellets under the same conditions.

The procedure for dispersing the fibers in the cement during the pelletizing process can be by techniques well known in the art. Asbestos fibers are commercially available in a variety of grades and sizes. Milled short-fiber asbestos is particularly suited for reinforcing pellets of the size used in fracturing operations.

The present invention also contemplates the use of cement pellets or clinker containing a resin, preferably a thermoset. The resin may be incorporated in the cement material prior to the pelletizing step. Preferably, however, the resin is impregnated in cured cement pellets or dried clinker. The cured cement pellets and clinker may be impregnated by the procedure described in detail below. Laboratory experiments indicate that the porosity of cured cement pellets and clinker permit impregnation with substantial amounts of a liquid synthetic resin—from about 3 to about 10 weight percent for cement and from about 2 to 6 weight percent for clinker. Resin impregnation improves the properties of each of the following materials: cement clinker, cement pellets, fiber-reinforced cement pellets, and cement pellets containing filler material. Specfically, the resin improves the strength of the pellets; it reduces the tendency of the pellets to disintegration under stress; and it provides a protective coating for the cement or clinker which otherwise would be attacked by brine.

A preferred procedure for impregnating the pellets of cement or clinker comprises oven drying the pellets, evacuating the dried pellets, soaking the pellets in a monomer, transferring the impregnated pellets to a bath, and polymerizing the monomer in place.

The oven drying step should be performed on cured cement pellets or clinker at between about 200°F. and 300°F for about 15 minutes with adequate air circulation to speed drying.

The dried pellets are then evacuated in a closed container, covered with resin or monomer, and pressurized with an inert gas, such as nitrogen to achieve impregnation, or at least partial impregnation, of the pellets. The liquid monomer should contain a suitable curing agent for initiating the polymerization step. The monomer may be used in pure form or diluted with a suitable diluent. Laboratory tests have shown that soaking pellets in a liquid resin at a pressure of between about 20 psig and 1000 psig for 15 minutes provides sufficient impregnation. The pellets impregnated with the liquid resin are then transferred to a water or oil bath for the polymerization step. The bath normally will be maintained at a temperature sufficient to promote the polymerization of the monomer or cure the resin. Particle agitation in the bath may be necessary to prevent pellet agglomeration. Particle agglomeration may also be retarded by use of certain surfactants in the bath liquid. Assignee's copending patent application Ser. No. 379,286 discloses surfactants useful for this purpose. The time required to complete the polymerization step will vary within wide limits depending upon the materials and the temperature employed.

The impregnation procedure described in general terms above and in more detail below is for illustrative purposes only. The procedure may be varied and still provide sufficient resin impregnation to improve the properties of the cement pellets or clinker. For example, conditions may be controlled to produce only partial impregnation of the resin in the pellets. The evacuation step may not always be required. Also, the polymerization step may be performed by radiation.

Examples of monomers usable to impregnate the cement pellets or clinker include methyl methacrylate (MMA), methyl methacrylate-trimethylolpropane trimethacrylate (MMA-TMPTMA), acrylonitrile, chlorostyrene, polyester-styrene, and blends of these monomers. An example of a suitable polymer is epoxy. This list is not exhaustive but is merely suggestive of material that can be used. Other liquid monomers or polymers capable of impregnating cement, and inert to formation fluids may also be used. A silane coupling agent may also be used to improve the bond between the resin and cement.

The impregnation technique described above will provide cement pellets with loadings of from 3 to 15 weight percent for cement and from 2 to 6 weight percent for clinker. (Percentages are based on the combined weight of the particle and resin.) These load levels also include the coating around the particle.

In performing the method of the present invention, the propping agent particles (reinforced or impregnated cement pellets or impregnated clinker sieved to the proper mesh size) are delivered in bulk to the well site along with other materials used in the treatment. The method can be performed using conventional equipment and techniques.

Following pressure tests of the pumping and well equipment, a viscous fluid, known as the pad, is injected into the well at sufficient rate and pressure to initiate and propagate a fracture in the formation. The fracturing fluid may be oil base, water base, acid, emulsion fluid or any other fluid used in hydraulic fracturing operations. It may contain additives such as viscosity builders, drag reducers, fluid loss additives, corrosion inhibitors, and the like. Injection of the pad is continued until a fracture of sufficient geometry is obtained to receive the propping agent particles. Normally a fracture width of two and one-half times the diameter of the largest pellet is sufficient. Once the fracture of the desired geometry is obtained, the propping agent suspended in the fluid is carried and placed in the fracture in the desired pattern. The pellets will normally be introduced into the fracturing fluid at a concentration sufficient to form a multi-layer in the fracture. Under certain conditions, however, it may be desirable to provide a propping pattern known as the partial monolayer, in which case the pellets will be relatively widely distributed in the propped fracture and form supporting pillars between the fracture walls. In any event, the concentration of the pellets will be from about 0.5 to about 5 pounds per gallon of fracturing fluid. Following placement of the proppant, the well is shut-in for sufficient time to permit the applied pressure to bleed off into the formation. This causes the fracture to close and exert a closure stress on the propping agent particles. The shut-in period may vary from a few minutes to several days.

When the well is placed on production, hydrocarbons will flow from the formation through the propped fracture and into the well. The closure stress of the fracture walls on the proppant tends to disintegrate the particles, forming fragments which under producing conditions collect and clog or plug interstitial flow passages in the propped fracture. Laboratory tests were performed on fiber reinforced cement pellets, and resin-filled cement pellets to determine the extent of pellet disintegration under stress. Additional tests were performed to determine the permeability retention of resin-filled cement pellets and clinker at various stress levels. These tests are discussed below under the headings Pellet Preparation, Laboratory Procedure, and Test Results.

Pellet Preparation

Cement pellets were prepared by mixing dry cement, additives (if used), and water in proper proportion to form a moist powder. The powder was then rolled in a drum to form the pellets. The pellets were permitted to cure for a period of from 1 to 4 days either in an autoclave or under water. The cured pellets were sieved to obtain test samples having a particle size range of 8 to 20 mesh or 8 to 12 mesh based on the U.S. Standard Sieve Series.

The procedure described above was used in preparing the following types of samples: (1) cement pellets without additives, (2) cement pellets with silica flour, (3) cement pellets with asbestos fibers, and (4) cement pellets with asbestos fibers and silica flour. For purposes of distinguishing the pellets, type (1) will be referred to as cement pellets, type (2) as filled cement pellets, and types (3) and (4) as reinforced cement pellets.

In addition to the cement pellets, clinker samples were prepared. The clinker was obtained from the Lone Star Cement Company of Houston, Texas and sieved to 4–6 mesh size. The composition of the various pellet samples are presented in Table I.

TABLE I

| Sample No. | Cement | | Additive | |
|---|---|---|---|---|
| | Type | Weight % | Type | Weight % |
| 1 | Class A[1] | 100 | | |
| 2 | Class C[1] | 100 | | |
| 3 | Aluminous[2] | 100 | | |
| 4 | Class A | 67 | Silica Flour | 33 |
| 5 | Aluminous | 67 | Silica Flour | 33 |
| 6 | Class A | 50 | Silica Flour | 50 |
| 7 | Aluminous | 85 | Asbestos Fibers[3] | 15 |
| 8 | Class C | 85 | Silica Flour | 15 |
| 9 | Class C | 57 | Asbestos Fibers[3] | 15 |
| | | | Silica Flour | 28 |
| 10 | Class C | 45 | Asbestos Fibers[3] | 22 |
| | | | Silica Flour | 33 |
| 11 | Class C | 80 | Asbestos Fibers[3] | 15 |
| | | | Cement Thinner[4] | 5 |
| 12 | Class C | 85 | Asbestos Fibers[3] | 13 |
| | | | Steel Wire | 1 |
| | | | Cement Thinner[4] | 1 |

TABLE I-Continued

| Sample No. | Cement | | Additive | |
|---|---|---|---|---|
| | Type | Weight % | Type | Weight % |
| 13 | Class C | 86 | Asbestos Fibers[3] | 13 |
| | | | Cement Thinner[4] | 1 |
| 14 | Class C | 87 | Asbestos Fibers[3] | 9 |
| | | | Cement Thinner[4] | 4 |
| 15 | Clinker | 100 | | |

[1]Classification of American Petroleum Institute, API STD 10A.
[2]Product of Canada Cement Lafarge Ltd. sold under tradename Fondue.
[3]Product of Johns Mansville Company, sold under trade designation 7D04, 7MF5, and 6DO4.
[4]Product of Halliburton Co., sold under trade designation CFR-2.

Portions of the above pellet samples were impregnated with a liquid thermosetting resin or monomers containing a suitable curing agent. The final composition of these products are shown in Table II.

TABLE II

| Pellet Sample No.[1] | Pellet Type | Resin |
|---|---|---|
| 5R | Filled Cement | Styrene-TMPTMA[2] |
| 2R | Cement | Epoxy[3] |
| 2R | Cement | Epoxy[4] |
| 1R | Cement | Epoxy[3] |
| 9R | Fiber Reinforced Cement | Styrene-TMPTMA[2] |
| 12R | Fiber Reinforced Cement | Styrene-TMPTMA[2] |
| 13R | Fiber Reinforced Cement | Styrene-TMPTMA[2] |
| 14R | Fiber Reinforced Cement | Expoxy[3] |
| 15R | Clinker | Styrene-TMPTMA[2] |

[1]Sample numeral refers to pellets listed on Table I and "R" signifies presence of a resin in the pellets.
[2]Styrene-trimethylolpropane trimethacrylate copolymer (60 weight percent styrene, product of Eastman Kodak Co.; 40 weight percent TMPTMA, product of Rohm & Haas Co., sold under tradename Monomer X-980) used with benzoyl peroxide curing agent.
[3]Product of Ciba-Geigy, Co., Inc., sold under tradename Araldite 6005; used with meta-phenylene diamine curing agent.
[4]Product of Ciba-Geigy Co., Inc., sold under tradename Araldite 1139, used with meta-phenylene diamine curing agent.

Test Procedure

Crushing tests were performed on the various samples according to the following procedure: the samples were screened to obtain 10–20 mesh particles. About 25 grams of each sample were placed in a multi-layer pattern in a two-inch diameter cylindrical cell and a force of 15,700 pounds (5000 psi) was applied for five minutes. The samples were then sieved through a 20 mesh screen to determine the amount of fines caused by particle disintegration. The results of these tests are presented in Table III.

The test apparatus for determining the permeability of various samples under stress included a pressure cell for containing the samples, platens for applying a force on the samples, a system for flowing fluid through the cell, and instruments for controlling and measuring the temperature and pressure within the cell. About 160 grams of the selected samples were placed in the cell and the permeability for the sample was determined at various stress levels by flowing brine at 150°F or 250°F through the packed cell. The equipment and test procedure used in these permeability tests are more fully described in SPE paper 4117, "Conductivity of Fracture Proppants in Multi-Layers", C. E. Cooke, Jr., published by the Society of Petroleum Engineers of AIME.

The results of the permeability tests are shown in Table IV. The permeability data for the two sizes (10–20 and 8–12 mesh) of the sand samples represent average values.

cement and clinker pellets in their ability to withstand high stresses with reduced disintegration and their ability to retain higher permeability under high closure stresses.

TABLE IV

Permeability Test Results

| Sample No. | Proppant | Composition | Mesh Size (U.S. Standard) | Stress (psi) | Permeability (Darcies) at 150°F. | at 250°F. |
|---|---|---|---|---|---|---|
| — | Sand | Silica | 8–12 | 1,000 | 2,900 | 900 |
|   |   |   |   | 2,000 | 2,800 | 700 |
|   |   |   |   | 4,000 | 400 | 290 |
| — | Sand | Silica | 10–20 | 1,000 | 900 | — |
|   |   |   |   | 2,000 | 700 | 650 |
|   |   |   |   | 4,000 | 2,800 | 130 |
| 9R | Impregnated Cement Pellets | Cement Asbestos Styrene-TMPTMA | 7–12 | 1,000 | 4,471 | — |
|   |   |   |   | 3,000 | 2,124 | — |
|   |   |   |   | 5,000 | 538 | 254 |
| 10R | Impregnated Cement Pellets | Cement Asbestos fibers Styrene-TMPTMA | 7–20 | 1,000 | — | — |
|   |   |   |   | 3,000 | 962 | — |
|   |   |   |   | 5,000 | 270 | 154 |
| 12R | Impregnated Cement Pellets | Cement Asbestos Steel wire Styrene-TMPTMA | 8–12 | 1,000 | 6,104 | — |
|   |   |   |   | 3,000 | 2,874 | — |
|   |   |   |   | 5,000 | 628 | 353 |
| 13R | Impregnated Cement Pellets | Cement Asbestos Epoxy | 8–12 | 1,000 | 3,469 | — |
|   |   |   |   | 3,000 | 1,182 | — |
|   |   |   |   | 5,000 | 256 | 128 |
| 14R | Impregnated Cement Pellets | Cement Asbestos Styrene-TMPTMA | 8–12 | 1,000 | 5,181 | — |
|   |   |   |   | 3,000 | 1,125 | — |
|   |   |   |   | 5,000 | 196 | 2 |
| 15R | Impregnated Cement Clinker | Cement Clinker Styrene-TMPTMA | 4–6 | 1,000 | 7,960 | — |
|   |   |   |   | 3,000 | 3,547 | — |
|   |   |   |   | 5,000 | 1,527 | 1,010 |

Test Results

From Table III, it can be seen that the impregnated cement pellets were far superior to sand and cement pellets in either unfilled or filled form. Moreover, the fiber reinforced cement pellets exhibited less tendency to crush than the sand or cement pellets in the unfilled or filled form. From these results it would be expected that the reinforced cement pellets or the impregnated cement pellets would perform much better than the other types of pellets.

TABLE III

Particle Crushing Test Results

| Material | Samples Tested | Weight % of sample passing 20 mesh screen (average) |
|---|---|---|
| Sand | 1 | 41 |
| Cement Pellets | 4 | 41 |
| Filled Cement Pellets | 5 | 35 |
| Reinforced Cement Pellets | 8 | 16 |
| Impregnated Cement Pellets | 6 | 10 |

Because of the superior results obtained in the crushing test of the impregnated cement pellets, tests were run to measure the effect of loading on the fluid permeability of these pellets and compare that effect with frac sand. The results of the permeability tests are shown in FIGS. 1 and 2. These plots were prepared from the test data shown in Table IV. At the high closure stresses, the six samples tested at 150°F performed better than sand of comparable size. Impregnated clinker and fiber-reinforced pellets containing styrene-TMPTMA resin performed particularly well at high stress levels.

The above tests demonstrated the superiority of the fiber-reinforced cement pellets, and the impregnated

I claim:

1. In a hydraulic fracturing method wherein a fluid is injected into a subterranean formation to open a fracture therein, the improvement comprising propping said fracture with hydraulic cement or clinker pellets impregnated with an effective amount of a resin to reduce pellet fragmentation.

2. In a hydraulic fracturing method wherein a fluid is injected into a subterranean formation to open a fracture therein, the improvement comprising propping said fracture with hydraulic cement or clinker pellets impregnated with 3 to 15 weight percent of a resin.

3. A method as defined in claim 2 wherein said resin is an epoxy resin.

4. A method as defined in claim 2 wherein said resin is an acrylic resin.

5. A method as defined in claim 2 wherein said resin is a polystyrene resin.

6. A method as defined in claim 2 wherein said resin is a polyester resin.

7. A method as defined in claim 2 wherein said resin is a polyesterstyrene copolymer.

8. A method as defined in claim 2 wherein said pellets are impregnated with a liquid thermosetting resin.

9. A method as defined in claim 2 wherein said pellets are prepared by impregnating said pellets with a monomer and polymerizing said monomer in place to solid condition.

10. A method as defined in claim 2 wherein said pellets have a particle size between about 4 and 100 mesh based on the U.S. Standard Sieve Series.

11. A method as defined in claim 2 wherein said pellets are composed principally of cured hydraulic cement.

12. A method as defined in claim 11 wherein said pellets further contain from 3 to 50 weight percent of a finely divided filler material based on the combined weight of said cement and said filler material.

13. A method as defined in claim 11 wherein said cement have dispersed therein from 3 to 50 percent by weight of a fibrous reinforcing material based on the combined weight of said cement and said material.

14. A method as defined in claim 13 wherein said fibrous reinforcing material is asbestos.

15. A method as defined in claim 13 wherein said fiber reinforced cement pellets contain from 3 to 15 weight percent of said resin based on the total weight of said pellets.

16. In a hydraulic fracturing method wherein a fluid is injected into a subterranean formation to open a fracture therein, the improvement comprising propping said fracture with hydraulic cement pellets containing from about 3 to about 50 percent by weight of a fibrous reinforcing material.

17. A method as defined in claim 16 wherein said fibrous reinforcing material is asbestos.

18. A method as defined in claim 16 wherein said pellets have a particle size between about 4 and 100 based on the U.S. Standard Sieve Series.

19. A method as defined in claim 16 wherein the fiber reinforced cement pellets are impregnated and coated with a resinous material.

20. A method of fracturing a subterranean formation surrounding a well which comprises injecting into said formation a fluid to open a fracture therein; injecting a fluid containing suspended propping agent pellets into said fracture, said pellets having a particle size between 4 and 100 mesh and being composed of cement impregnated and coated with a synthetic resin; and thereafter placing said well on production.

21. A method of fracturing a subterranean formation surrounding a well which comprises injecting into said formation fluid having suspended therein cement clinker coated and at least partially impregnated with a synthetic resinous material.

* * * * *